United States Patent
Park

(10) Patent No.: US 9,884,557 B2
(45) Date of Patent: Feb. 6, 2018

(54) APPARATUS AND METHOD OF PREVENTING OVER-DISCHARGE OF VEHICLE BATTERY

(71) Applicants: HYUNDAI MOTOR COMPANY, Seoul (KR); KIA MOTORS CORPORATION, Seoul (KR)

(72) Inventor: Hyun Soo Park, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 59 days.

(21) Appl. No.: 15/200,678

(22) Filed: Jul. 1, 2016

(65) Prior Publication Data

US 2017/0144549 A1 May 25, 2017

(30) Foreign Application Priority Data

Nov. 23, 2015 (KR) .......................... 10-2015-0164324

(51) Int. Cl.
*B60L 3/04* (2006.01)
*B60L 3/12* (2006.01)
(Continued)

(52) U.S. Cl.
CPC .............. *B60L 3/04* (2013.01); *B60L 3/0046* (2013.01); *B60L 3/0084* (2013.01); *B60L 3/12* (2013.01);
(Continued)

(58) Field of Classification Search
CPC ........ B60L 3/04; B60L 3/0046; B60L 3/0084; B60L 3/12; H01H 47/002; H02H 7/18;
(Continued)

(56) References Cited

U.S. PATENT DOCUMENTS 7,421,323 B2 * 9/2008 Dannenberg .......... F02D 31/001
307/130
9,393,920 B2 * 7/2016 Hosey ..................... B60R 16/03
(Continued)

FOREIGN PATENT DOCUMENTS

CN    104578324 A    4/2015
DE    10 2012 211393 A1    1/2014
(Continued)

OTHER PUBLICATIONS

Masjosthusmann et al. "A Vehicle Energy Management System for a Battery Electric Vehicle," 2012 IEEE Vehicle Power and Propulsion Conference, Oct. 2012, pp. 339-344, (Year: 2012).*

(Continued)

*Primary Examiner* — Todd Melton
(74) *Attorney, Agent, or Firm* — McDermott Will & Emery LLP

(57) ABSTRACT

An apparatus of preventing over-discharge of a battery for a vehicle includes a voltage sensor for sensing a voltage of the battery, a relay for preventing the over-discharge of the battery, a power state sensor for sensing an ignition on state, and a controller for outputting a warning message when the voltage of the battery becomes a first threshold value in the ignition on state and for turning off the relay after transmitting shut-off commands to the respective electronic control units (ECUs) through a vehicle network when the voltage of the battery becomes a second threshold value.

20 Claims, 2 Drawing Sheets

(51) Int. Cl.
 *B60L 3/00* (2006.01)
 *H01H 47/00* (2006.01)
 *H02H 7/18* (2006.01)
 *H02H 7/20* (2006.01)

(52) U.S. Cl.
 CPC ............ *H01H 47/002* (2013.01); *H02H 7/18* (2013.01); *H02H 7/20* (2013.01); *B60L 2240/547* (2013.01); *B60L 2250/10* (2013.01); *Y10S 903/907* (2013.01)

(58) Field of Classification Search
 CPC ........ H02H 7/20; H02J 7/0031; H02J 7/0032; H02J 2007/004
 See application file for complete search history.

(56) References Cited

U.S. PATENT DOCUMENTS

| | | |
|---|---|---|
| 2009/0220825 A1 | 9/2009 | Nakashima et al. |
| 2009/0278501 A1 | 11/2009 | Ho |
| 2010/0129700 A1 | 5/2010 | Tanno |
| 2013/0158762 A1* | 6/2013 | An .......................... G06F 17/00 701/22 |
| 2014/0001844 A1 | 1/2014 | Krieg |
| 2014/0343831 A1 | 11/2014 | Hosey et al. |
| 2015/0162763 A1 | 6/2015 | Kimura et al. |
| 2015/0243972 A1 | 8/2015 | Ito et al. |
| 2016/0226260 A1 | 8/2016 | Wu |

FOREIGN PATENT DOCUMENTS

| | | |
|---|---|---|
| EP | 1868274 A1 | 12/2007 |
| JP | 2007-210473 A | 8/2007 |
| JP | 2007-237768 A | 9/2007 |
| JP | 2012-092586 A | 5/2012 |
| KR | 20-1999-005310 U | 2/1999 |
| KR | 10-2011-0134018 A | 12/2011 |
| KR | 10-1251525 B1 | 4/2013 |

OTHER PUBLICATIONS

Korean Office Action dated Feb. 10, 2017, issued in Korean patent application No. 10-2015-0164324.
European Search Report dated May 9, 2017, issued in European Patent Application No. 16175405.6.

* cited by examiner

APPARATUS AND METHOD OF PREVENTING OVER-DISCHARGE OF VEHICLE BATTERY

CROSS-REFERENCE TO RELATED APPLICATION

This application claims the benefit of priority to Korean Patent Application No. 10-2015-0164324, filed on Nov. 23, 2015 with the Korean Intellectual Property Office, the disclosure of which is incorporated herein in its entirety by reference.

TECHNICAL FIELD

The present disclosure relates to an apparatus and a method of preventing over-discharge of a vehicle battery, and more particularly, to a technology of protecting controllers as well as a battery (for example, a lithium ion battery of 12V) supplying power to electric loads of a vehicle by controlling shut-off sequences of the controllers in the vehicle to be performed at the time of turning off a relay for preventing over-discharge of a lithium ion battery.

BACKGROUND

Generally, a vehicle includes a high voltage battery for supplying driving power and an auxiliary battery for supplying operation power to an internal electrical apparatus (an electric load). Here, a low voltage direct current (DC) to DC converter (LDC) connected to the auxiliary battery and the electrical apparatus down-converts a high voltage of the high voltage battery into a voltage for charging the auxiliary battery when a voltage of the auxiliary battery does not exceed a reference value under a control of a higher controller.

The auxiliary battery serves to supply operation power to electrical apparatus such as lamps, systems, electronic control units (ECUs), and the like, as well as for starting the vehicle.

Lead-acid storage batteries have been mainly used as the auxiliary battery of a vehicle since lead-acid may be recharged and be used even though they are completely discharged. However, a lead-acid storage battery is heavy and has a low charging density, and lead-acid used in the lead-acid storage battery may have adverse environmental effects. Therefore, the lead-acid storage battery has been replaced by a lithium ion battery in an some vehicles.

However, when a lithium ion battery is over-discharged, performance deterioration of the lithium ion battery may appear at the time of recharging the lithium ion battery. Therefore, in order to address this situation, technologies of preventing over-discharge of the lithium ion battery by allowing a battery management system (BMS) to include a relay for preventing the over-discharge have been developed.

There exists a conventional technology of protecting a battery for a vehicle by turning off a relay when the battery for a vehicle is in an over-discharge state. However, this technology may be a technology of simply protecting only the battery for a vehicle, and may not protect the respective controllers in the vehicle that are being operated in an ignition-on state.

SUMMARY

The present disclosure has been made to solve the above-mentioned problems occurring in the prior art while advantages achieved by the prior art are maintained intact.

An aspect of the present disclosure provides an apparatus and a method of preventing over-discharge of a battery for a vehicle capable of safely protecting the respective controllers in the vehicle as well as a battery (for example, a lithium ion battery of 12V) supplying power to electric loads of the vehicle by controlling shut-off sequences of the respective controllers in the vehicle to be performed at the time of turning off a relay for preventing over-discharge of the lithium ion battery of 12V.

Objects of the present disclosure are not limited to the above-mentioned object, and other objects and advantages of the present disclosure that are not mentioned may be understood by the following description and will be more clearly appreciated by exemplary embodiments of the present disclosure. In addition, it may be easily appreciated that objects and advantages of the present disclosure may be realized by means mentioned in the claims and a combination thereof.

According to an exemplary embodiment of the present disclosure, an apparatus of preventing over-discharge of a battery for a vehicle may include: a voltage sensor for sensing a voltage of the battery; a relay for preventing the over-discharge of the battery; a power state sensor for sensing an ignition on state; and a controller for outputting a warning message when the voltage of the battery becomes a first threshold value in the ignition on state and turning off the relay after transmitting shut-off commands to the respective electronic control units (ECUs) through a vehicle network when the voltage of the battery becomes a second threshold value.

According to another exemplary embodiment of the present disclosure, a method of preventing over-discharge of a battery for a vehicle may include: sensing an ignition on state by a power state sensor; sensing a voltage of the battery by a voltage sensor; outputting a warning message by a controller when the voltage of the battery becomes a first threshold value in the ignition on state; transmitting shut-off commands to the respective ECUs through a vehicle network by the controller when the voltage of the battery becomes a second threshold value; and turning off a relay for preventing the over-discharge of the battery by the controller.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned objects, features, and advantages will become more obvious from the following description described below in detail with reference to the accompanying drawings. Therefore, those skilled in the art to which the present disclosure pertains may easily practice a technical idea, or concept, of the present disclosure. Further, in describing the present disclosure, in the case in which it is decided that a detailed description of a well-known technology associated with the present disclosure may unnecessarily obscure concepts of the present disclosure, such description will be omitted. Hereinafter, exemplary embodiments of the present disclosure will be described in detail with reference to the accompanying drawings.

Figure 1:
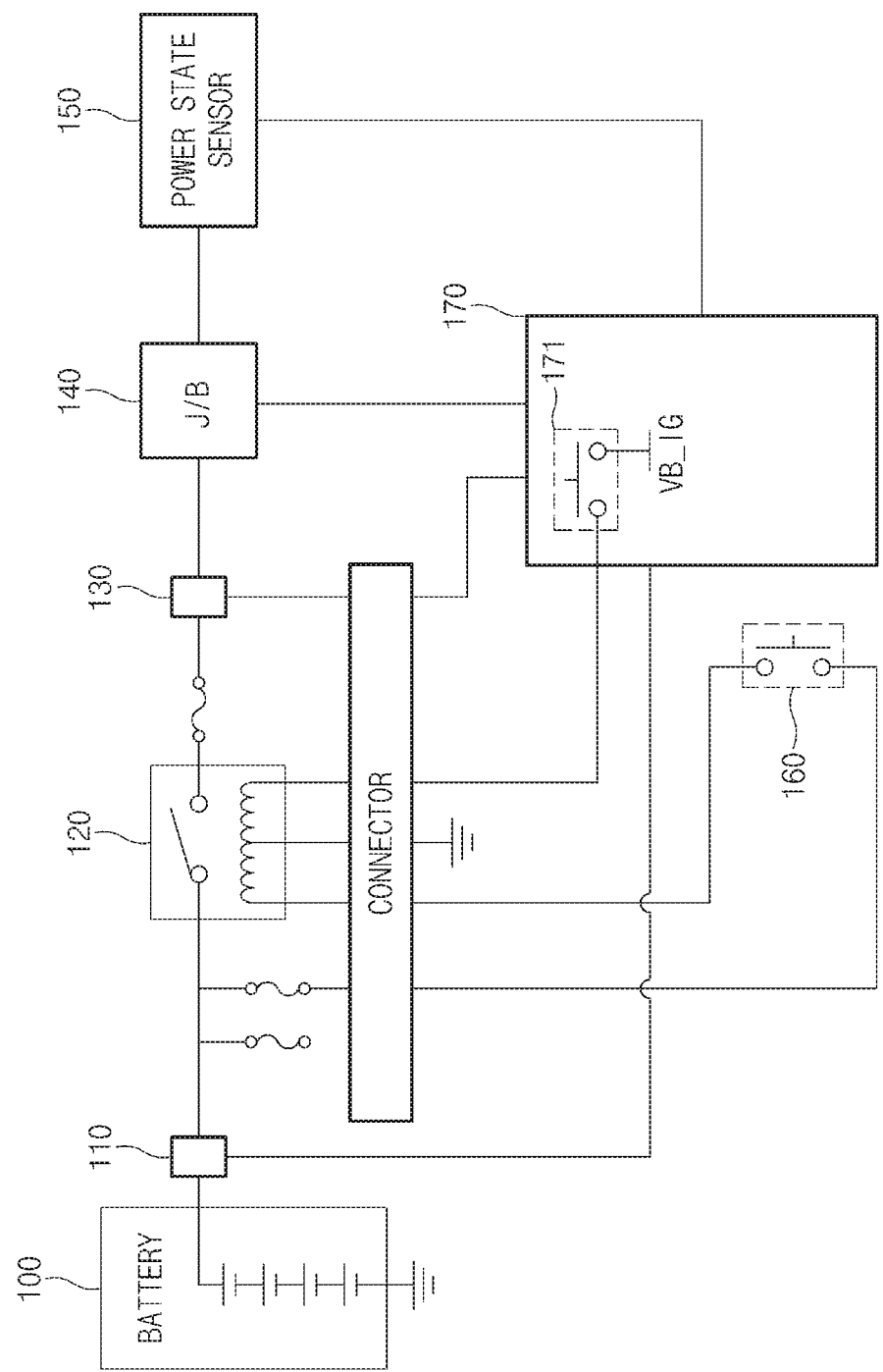
FIG. 1 is a block diagram illustrating an apparatus for preventing over-discharge of a vehicle battery according to an exemplary embodiment of the present disclosure.

FIG. 1 is a block diagram illustrating an apparatus of preventing over-discharge of a vehicle battery according to an exemplary embodiment of the present disclosure.

As illustrated in FIG. 1, an apparatus of preventing over-discharge of a battery for a vehicle according to an exemplary embodiment of the present disclosure may include a battery 100, a voltage sensor 110, a relay 120, a current sensor 130, an engine room junction box (J/B) 140, a power state sensor 150, a switch 160, a controller 170, and the like.

The respective components will now be described. The battery 100, which may be a lithium ion battery of 12V (a low-voltage auxiliary battery), supplies power required for electric loads of the vehicle. The battery 100 may also be implemented by a lead-acid storage battery, or another type of battery.

Next, the voltage sensor 110 may sense a voltage of the battery 100.

Next, the relay 120 may serve to supply power from the battery 100 to the electric loads or to block the supply of the power from the battery 100 to the electric loads, thereby making it possible to prevent over-discharge of the battery 100 and completely block the battery 100 from a dark current flowing to the electric loads. Here, the relay 120 may be implemented by a latching type relay controlled by a pulse signal.

Next, the current sensor 130 may be positioned between the relay 120 and the engine room junction box 140, and sense a current of the battery 100.

Next, the engine room junction box 140 may include lines for branching power of the battery 100 into the respective electric loads. The engine room junction box 140 may supply operation power to the power state sensor 150.

Next, the power state sensor 150 may sense a state (hereinafter, referred to as a power state) in which the power of the battery 100 is supplied to the electric loads. Here, the power state may include four states including a lock state, an accessory (ACC) state, an ignition on (ON) state, and a start state, which may be applied to, and used with, a start key scheme and a start button scheme. In the present disclosure, the ignition on state may mean a state in which the power of the battery 100 is to be supplied to electric loads of a vehicle.

Next, the switch 160, which may be a passive switch, may be operated by a manipulation of a user to turn on the relay 120. That is, in a state in which the controller 170 turns off the relay 120 in order to prevent the over-discharge of the battery 100, when a driver gets into the vehicle and turns on the switch 160, the relay 120 may be turned on, such that the power from the battery 100 is supplied to the electric loads.

Next, the controller 170 may perform a general control so that the respective components described above may normally perform their functions.

Particularly, the controller 170 may turn off the relay 120 using a switch 171 provided therein in order to prevent the over-discharge of the battery 100 supplying the power to the electric loads of the vehicle.

That is, as a relay turn-off preparing step, the controller 170 may output a warning message for inducing the start of the vehicle by the driver through a cluster, or another indication method, when a voltage of the battery 100 in the ignition on state becomes a first threshold value (for example, 11V).

Then, in a relay turn-off step, the controller 170 may turn off the relay 120 after transmitting shut-off commands to electronic control units (ECUs) in the vehicle through a vehicle network, when the vehicle is not started by the driver, such that the voltage of the battery 100 becomes a second threshold value (smaller than the first threshold value (for example, 10.5V)). Here, the controller 170 may turn off the relay 120 after receiving completion messages from the respective ECUs in the vehicle, monitor outputs of the ECUs through the vehicle network and turn off the relay 120 in the case in which the ECUs are not operated, or turn off the relay 120 after the controller 170 transmits shut-off commands to the respective ECUs in the vehicle and a predetermined time elapses.

Here, the vehicle network may include a controller area network (CAN), a local interconnection network (LIN), a FlexRay, a media oriented system transport (MOST), and the like.

Then, the controller 170 may output a warning message through the cluster when the driver turns on the relay using the switch 160 and then may perform ignition-on, and may perform a post-processing process of again turning off the relay 120 when the vehicle does not start in a threshold time.

The post-processing process may be repeatedly performed by the set number of times. The threshold time may be set to be short, or shortened, as the number of times of the repeatedly performed post-processing process is increased. For example, in the case in which the number of times the repeatedly performed post-processing process is performed is three, the threshold time may be set to 3 minutes in a primary number of times, may be set to 1 minute in a secondary number of times, and may be set to 30 seconds in a tertiary number of times.

In addition, when the number of times of the repeatedly performed post-processing process is performed exceeds the set number of times, the use of the battery 100 may be completely blocked. Then, only in the case in which an after-sale service (AS) mechanic directly accesses a system to release the blocking, the battery 100 may be used.

The present disclosure may be implemented so as not to be operated for the purpose of safety of the driver in the case in which the vehicle is being driven. However, in the case in which the over-discharge of the battery 100 is sensed, the vehicle may enter a limp home mode (an emergency control mode or a safety mode).

In addition, in the present disclosure, the respective ECUs in the vehicle may perform shut-off sequences for stably shutting off the system depending on the shut-off commands.

Figure 2:
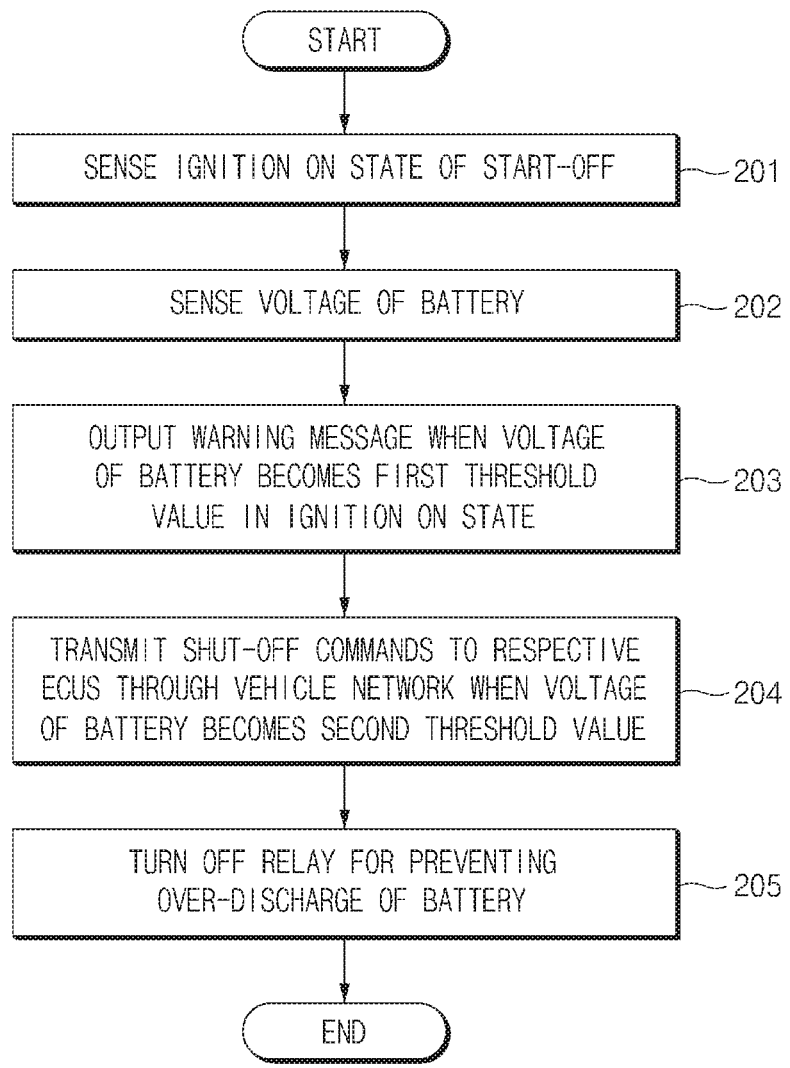
FIG. 2 is a flowchart illustrating a method of preventing over-discharge of a vehicle battery according to an exemplary embodiment of the present disclosure.

FIG. 2 is a flowchart illustrating a method of preventing over-discharge of a battery for a vehicle according to an exemplary embodiment of the present disclosure.

First, the power state sensor 150 may sense an ignition-on state (201).

Then, the voltage sensor 110 may sense the voltage of the battery 100 (202).

Then, when the voltage of the battery 100 becomes the first threshold value (for example, 11V) in the ignition on state, the controller 170 may output the warning message (203).

When the voltage of the battery 100 becomes the second threshold value (for example, 10.5V) with the passage of time, the controller 170 may transmit the shut-off commands to the respective ECUs through the vehicle network (204).

Then, the controller 170 may turn off the relay 120 for preventing the over-discharge of the battery 100 (205).

Through the process described above, the controller may control the shut-off sequences of the respective controller in the vehicle to be performed, thereby making it possible to safely protect the respective controller in the vehicle as well as the lithium ion battery of 12V.

Meanwhile, the method of preventing over-discharge of a battery for a vehicle according to an exemplary embodiment of the present disclosure as described above may be created, or implemented, by a computer program. In addition, codes and code segments configuring the computer program may be easily inferred, and/or produced, by a computer programmer skilled in the related art. Further, the created computer program is stored in a computer-readable recording medium (information storing medium) and is read and executed by a computer to implement the method of preventing over-discharge of a battery for a vehicle according to an exemplary embodiment of the present disclosure. Further, the computer-readable recording medium includes all types of recording media that are readable by the computer.

As described above, according to exemplary embodiments of the present disclosure, it is possible to safely protect the respective controllers in the vehicle as well as the battery (for example, the lithium ion battery of 12V) supplying power to the electric loads of the vehicle by controlling the shut-off sequences of the respective controllers in the vehicle to be performed at the time of turning off the relay for preventing the over-discharge of the lithium ion battery of 12V.

In addition, according to exemplary embodiments of the present disclosure, it is possible to promote safety of passengers in the vehicle as well as the vehicle by prohibiting the turn-off of the relay in a state in which the vehicle starts or is being driven.

The present disclosure may be applied to an eco-friendly vehicle. The eco-friendly vehicle, which is a vehicle driven by driving an electrical motor using a high voltage battery, includes a hybrid electric vehicle (HEV), an electric vehicle (EV), a plug-in hybrid electric vehicle (PHEV), a fuel cell electric vehicle (FCEV), and the like.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus of preventing over-discharge of a battery for a vehicle, comprising:
    a voltage sensor for sensing a voltage of the battery;
    a relay for preventing the over-discharge of the battery;
    a power state sensor for sensing an ignition on state; and
    a controller for outputting a warning message when the voltage of the battery becomes a first threshold value in the ignition on state and for turning off the relay after transmitting shut-off commands to one or more respective electronic control units (ECUs) through a vehicle network when the voltage of the battery becomes a second threshold value.

2. The apparatus of preventing over-discharge of a battery for a vehicle according to claim 1, wherein the controller turns off the relay after receiving completion messages from the respective ECUs in the vehicle.

3. The apparatus of preventing over-discharge of a battery for a vehicle according to claim 1, wherein the controller monitors operations of the respective ECUs through the vehicle network and turns off the relay in the case in which the respective ECUs are not operated.

4. The apparatus of preventing over-discharge of a battery for a vehicle according to claim 1, wherein the controller turns off the relay after the controller transmits the shut-off commands to the respective ECUs in the vehicle and a first threshold time elapses.

5. The apparatus of preventing over-discharge of a battery for a vehicle according to claim 1, further comprising a passive switch for turning on the relay,
    wherein the controller again outputs the warning message through a cluster when the relay is turned on by the passive switch and the ignition on state is entered, and performs a post-processing process of again turning off the relay when the vehicle does not start in a second threshold time.

6. The apparatus of preventing over-discharge of a battery for a vehicle according to claim 5, wherein the controller repeatedly performs the post-processing process by the set number of times, and blocks the use of the battery when the number of times of the repeatedly performed post-processing process exceeds the set number of times.

7. The apparatus of preventing over-discharge of a battery for a vehicle according to claim 6, wherein the controller sets the second threshold time to be shorter as the number of times of the repeatedly performed post-processing process is increased.

8. The apparatus of preventing over-discharge of a battery for a vehicle according to claim 1, wherein the battery is a lithium ion battery of 12V.

9. The apparatus of preventing over-discharge of a battery for a vehicle according to claim 1, wherein the relay is a latching type relay controlled by a pulse signal.

10. The apparatus of preventing over-discharge of a battery for a vehicle according to claim 1, wherein the vehicle network is any one of a controller area network (CAN), a local interconnection network (LIN), a FlexRay, and a media oriented system transport (MOST).

11. A method of preventing over-discharge of a battery for a vehicle, comprising:
    sensing an ignition on state by a power state sensor;
    sensing a voltage of the battery by a voltage sensor;
    outputting a warning message by a controller when the voltage of the battery becomes a first threshold value in the ignition on state;
    transmitting shut-off commands to one or more respective ECUs through a vehicle network by the controller when the voltage of the battery becomes a second threshold value; and
    turning off a relay for preventing the over-discharge of the battery by the controller.

12. The method of preventing over-discharge of a battery for a vehicle according to claim 11, wherein in the step of turning off the relay, the relay is turned off after completion messages are received from the respective ECUs in the vehicle.

13. The method of preventing over-discharge of a battery for a vehicle according to claim 11, wherein in the step of turning off the relay, operations of the respective ECUs are monitored through the vehicle network, and the relay is turned off in the case in which the respective ECUs are not operated.

14. The method of preventing over-discharge of a battery for a vehicle according to claim 11, wherein in the step of turning off the relay, the relay is turned off after the shut-off commands are transmitted to the respective ECUs in the vehicle and a first threshold time elapses.

15. The method of preventing over-discharge of a battery for a vehicle according to claim 11, further comprising:

turning on the relay by a passive switch; and again outputting the warning message through a cluster by the controller when the ignition on state is again entered by a driver and performing a post-processing process of again turning off the relay when the vehicle does not start in a second threshold time.

16. The method of preventing over-discharge of a battery for a vehicle according to claim 15, wherein the post-processing process is repeatedly performed by the set number of times, and the use of the battery is blocked by the controller when the number of times of the repeatedly performed post-processing process exceeds the set number of times.

17. The method of preventing over-discharge of a battery for a vehicle according to claim 16, wherein the second threshold time is set to be shorter as the number of times of the repeatedly performed post-processing process is increased.

18. The method of preventing over-discharge of a battery for a vehicle according to claim 11, wherein the battery is a lithium ion battery of 12V.

19. The method of preventing over-discharge of a battery for a vehicle according to claim 11, wherein the relay is a latching type relay controlled by a pulse signal.

20. The method of preventing over-discharge of a battery for a vehicle according to claim 11, wherein the vehicle network is any one of a controller area network (CAN), a local interconnection network (LIN), a FlexRay, and a media oriented system transport (MOST).

* * * * *